(12) United States Patent
Hutton et al.

(10) Patent No.: US 9,038,174 B2
(45) Date of Patent: May 19, 2015

(54) RESISTING THE SPREAD OF UNWANTED CODE AND DATA

(71) Applicant: GLASSWALL (IP) LIMITED, Chelmsford (GB)

(72) Inventors: Samuel Harrison Hutton, Herts (GB); Trevor Goddard, Herts (GB)

(73) Assignee: Glasswall IP Limited, London (GB)

( * ) Notice: Subject to any disclaimer, the term of this patent is extended or adjusted under 35 U.S.C. 154(b) by 98 days.

(21) Appl. No.: 13/899,043

(22) Filed: May 21, 2013

(65) Prior Publication Data

US 2013/0326624 A1    Dec. 5, 2013

Related U.S. Application Data

(63) Continuation of application No. 12/517,614, filed as application No. PCT/GB2007/004258 on Nov. 8, 2007, now Pat. No. 8,533,824.

(30) Foreign Application Priority Data

Dec. 4, 2006    (GB) .................................. 0624224.2

(51) Int. Cl.
*G06F 21/56* (2013.01)
*H04L 29/06* (2006.01)
*G06Q 10/10* (2012.01)

(52) U.S. Cl.
CPC ............ *G06F 21/565* (2013.01); *G06Q 10/107* (2013.01); *H04L 63/1408* (2013.01); *H04L 63/145* (2013.01); *H04L 63/1416* (2013.01); *G06F 21/562* (2013.01)

(58) Field of Classification Search
CPC ............ H04L 63/1416; H04L 63/1408; H04L 63/145; G06Q 1/107
USPC .................................. 726/20, 22, 24; 709/206
See application file for complete search history.

(56) References Cited

U.S. PATENT DOCUMENTS 5,050,212 A    9/1991 Dyson
5,649,095 A    7/1997 Cozza
(Continued)

FOREIGN PATENT DOCUMENTS

DE    10235819 A1    2/2004
DE    10235819 A1    2/2004
(Continued)

OTHER PUBLICATIONS

Apr. 13, 2006 Search Report in connection with counterpart British patent application No. GB0511749.4.
(Continued)

*Primary Examiner* — Michael Pyzocha
*Assistant Examiner* — Shaqueal Wade
(74) *Attorney, Agent, or Firm* — Marger Johnson & McCollom PC

(57) ABSTRACT

A method of processing an electronic file by identifying portions of content data in the electronic file and determining if each portion of content data is passive content data having a fixed purpose or active content data having an associated function. If a portion is passive content data, then a determination is made as to whether the portion of passive content data is to be re-generated. If a portion is active content data, then the portion is analyzed to determine whether the portion of active content data is to be re-generated. A re-generated electronic file is then created from the portions of content data which are determined to be re-generated.

14 Claims, 8 Drawing Sheets

(56) References Cited

U.S. PATENT DOCUMENTS

| | | |
|---|---|---|
| 5,655,130 A | 8/1997 | Dodge et al. |
| 5,745,897 A | 4/1998 | Perkins et al. |
| 5,832,208 A | 11/1998 | Chen et al. |
| 5,951,698 A | 9/1999 | Chen et al. |
| 6,144,934 A | 11/2000 | Stockwell et al. |
| 6,336,124 B1 | 1/2002 | Alam et al. |
| 6,401,210 B1 | 6/2002 | Templeton |
| 6,493,761 B1 | 12/2002 | Baker et al. |
| 6,697,950 B1 | 2/2004 | Ko |
| 6,807,632 B1 | 10/2004 | Carpentier et al. |
| 6,922,827 B2 | 7/2005 | Vasilik et al. |
| 7,093,135 B1 | 8/2006 | Radatti et al. |
| 7,225,181 B2 | 5/2007 | Tsuda |
| 7,240,279 B1 | 7/2007 | Chartier et al. |
| 7,269,733 B1 | 9/2007 | O'Toole, Jr. |
| 7,496,963 B2 | 2/2009 | Shipp |
| 7,607,172 B2 | 10/2009 | Zurko et al. |
| 7,636,856 B2 | 12/2009 | Gheorghescu et al. |
| 7,664,754 B2 | 2/2010 | Shipp |
| 7,685,174 B2 | 3/2010 | Koestler |
| 7,756,834 B2 | 7/2010 | Masters et al. |
| 8,185,954 B2 | 5/2012 | Scales |
| 2002/0004908 A1 | 1/2002 | Galea |
| 2002/0072926 A1 | 6/2002 | Morita et al. |
| 2002/0073330 A1 | 6/2002 | Chandnani et al. |
| 2002/0174185 A1 | 11/2002 | Rawat et al. |
| 2002/0178396 A1 | 11/2002 | Wong et al. |
| 2002/0184555 A1 | 12/2002 | Wong et al. |
| 2003/0079142 A1 | 4/2003 | Margalit et al. |
| 2003/0079158 A1 | 4/2003 | Tower et al. |
| 2003/0120949 A1 | 6/2003 | Redlich et al. |
| 2003/0145213 A1 | 7/2003 | Carbone |
| 2003/0163732 A1 | 8/2003 | Parry |
| 2003/0163799 A1 | 8/2003 | Vasilik et al. |
| 2003/0196104 A1 | 10/2003 | Baber et al. |
| 2003/0229810 A1 | 12/2003 | Bango |
| 2004/0008368 A1 | 1/2004 | Plunkett et al. |
| 2004/0049687 A1 | 3/2004 | Orsini et al. |
| 2004/0054498 A1 | 3/2004 | Shipp |
| 2004/0107386 A1* | 6/2004 | Burdick et al. ............... 714/38 |
| 2004/0181543 A1 | 9/2004 | Wu et al. |
| 2004/0199594 A1 | 10/2004 | Radatti et al. |
| 2004/0230903 A1 | 11/2004 | Elza et al. |
| 2005/0071477 A1 | 3/2005 | Evans et al. |
| 2005/0081057 A1 | 4/2005 | Cohen et al. |
| 2005/0132206 A1 | 6/2005 | Palliyil et al. |
| 2005/0132227 A1 | 6/2005 | Reasor et al. |
| 2005/0149720 A1 | 7/2005 | Gruper et al. |
| 2005/0193070 A1 | 9/2005 | Brown et al. |
| 2005/0198691 A1* | 9/2005 | Xiang et al. ............... 726/3 |
| 2005/0246159 A1 | 11/2005 | Perla et al. |
| 2005/0278318 A1 | 12/2005 | Vasilik et al. |
| 2006/0015747 A1* | 1/2006 | Van de Ven ............... 713/188 |
| 2006/0037079 A1 | 2/2006 | Midgley |
| 2006/0044605 A1 | 3/2006 | Schneider et al. |
| 2006/0095971 A1 | 5/2006 | Costea et al. |
| 2006/0195451 A1 | 8/2006 | Smith et al. |
| 2006/0230452 A1 | 10/2006 | Field |
| 2007/0067397 A1* | 3/2007 | Tran ............... 709/206 |
| 2007/0079379 A1 | 4/2007 | Sprosts et al. |
| 2007/0083929 A1 | 4/2007 | Sprosts et al. |
| 2007/0277238 A1 | 11/2007 | Margalit et al. |
| 2009/0138972 A1 | 5/2009 | Scales |
| 2009/0178144 A1 | 7/2009 | Redlich et al. |
| 2009/0210936 A1 | 8/2009 | Omar et al. |
| 2009/0254992 A1 | 10/2009 | Schultz et al. |
| 2009/0296657 A1 | 12/2009 | Omar et al. |
| 2010/0054278 A1 | 3/2010 | Stolfo et al. |
| 2010/0153507 A1 | 6/2010 | Wei et al. |
| 2011/0213783 A1 | 9/2011 | Keith, Jr. |

FOREIGN PATENT DOCUMENTS

| | | |
|---|---|---|
| EP | 0751643 A1 | 1/1997 |
| EP | 0751643 A1 | 1/1997 |
| EP | 1022639 A2 | 7/2000 |
| EP | 1022639 A2 | 7/2000 |
| EP | 1122932 A2 | 8/2001 |
| EP | 1122932 A2 | 8/2001 |
| EP | 1180880 A1 | 2/2002 |
| EP | 1180880 A1 | 2/2002 |
| EP | 1560112 A1 | 8/2005 |
| EP | 1560112 A1 | 8/2005 |
| EP | 1657662 | 5/2006 |
| EP | 1657662 A2 | 5/2006 |
| EP | 1657662 A2 | 5/2006 |
| GB | 2357939 A | 7/2001 |
| GB | 2357939 A | 7/2001 |
| GB | 2427048 A | 12/2006 |
| GB | 2427048 A | 12/2006 |
| JP | 11-224190 | 8/1999 |
| JP | 11224190 | 8/1999 |
| JP | 2000-222202 | 8/2000 |
| JP | 2000222202 | 8/2000 |
| JP | 2002-259187 | 9/2002 |
| JP | 2002259187 | 9/2002 |
| JP | 2006-127497 | 5/2006 |
| JP | 2006127497 | 5/2006 |
| WO | 0126004 A2 | 4/2001 |
| WO | 03/017141 A1 | 2/2003 |
| WO | WO03/017141 A1 | 2/2003 |
| WO | 2004/107684 A1 | 12/2004 |
| WO | WO2004/107684 A1 | 12/2004 |
| WO | 2005/008457 A1 | 1/2005 |
| WO | WO2005/008457 A1 | 1/2005 |
| WO | 2006/047163 A2 | 5/2006 |
| WO | WO2006/047163 A2 | 5/2006 |

OTHER PUBLICATIONS

Apr. 16, 2012 European official action in connection with European patent application No. 06744158.4.

Canadian official action dated Feb. 21, 2013 in corresponding Canadian application No. 2,611,227.

"Checking of Incoming Files for Macro Viruses," Online 2004, retrieved from the Internet: http://www.bsi.de/english/gshb/manuals/s04044.html.

English translation of Mar. 21, 2012 Japanese official action in connection with a counterpart JP application.

Feb. 15, 2011 official action in connection with European patent application No. 06744158.4.

Great Britain search report in connection with Great Britain patent application No. GB624224.2.

"MailStreet Features and Benefits," Apr. 22, 2004, retrieved from the Internet: http://web.archive.org/web/2004042104456/http://www.mailstreet.com/defender/features.asp.

Oct. 21, 2005 search report in connection with counterpart British patent application No. GB0511749.4.

Oct. 4, 2006 international search report in connection with counterpart application No. PCT/GB2006/002107.

Saito, Tado, et al. (1993) "Protection Against Trojan Horses by Source Code Analysis," Electronics and Communication in Japan-Fundamental Electronic Science, Part 3, vol. 77, No. 1, pp. 11-18.

Salamone, Salvatore (1992), "A Magic Bullet for Netware Viruses. Untouchable Network NLM Can Detect and Eliminate Known and Unknown Viruses from Netware Servers," Data Communications, vol. 21, pp. 45-46.

Sep. 21, 2011 Japanese official action in connection with counterpart Japanese patent application No. 2008-515291.

Canadian official action dated Feb. 21, 2013 in a corresponding Canadian patent application No. 2,611,227.

English translation of Mar. 21, 2012 Japanese official action in connection with a counterpart Japanese patent application.

Saito, Tadao, et al. (1993), "Protection Against Trojan Horses by Source Code Analaysis," Electronics and Communications in Japan—Fundamental Electronic Science , Part 3, vol. 77, No. 1, pp. 11-18.

(56) References Cited

OTHER PUBLICATIONS

Oct. 21, 2005 search report in connection with British patent application No. GB0511749.

Apr. 13, 2006 search report in connection with European patent application No. GB0511749.4.

Oct. 4, 2006 International Search Report in connection with international application No. PCT/GB2006/002107.

Sep. 7, 2011 Japanese official action in connection with Japanese patent Application No. 2008-515291.

Apr. 16, 2012 European official action in connection with European patent application No. 06 744 158.4.

U.S. Appl. No. 13/438,933, filed Apr. 4, 2012 (including Preliminary Amendment).

Sep. 7, 2011 Japanese official action in connection with counterpart Japanese patent application No. 2008-515291.

Feb. 15, 2011 official action in connection with counterpart European patent application No. 06 744 158.4.

Great Britain search report in connection with a counterpart Great Britain patent application No. GB0624224.2.

* cited by examiner

RESISTING THE SPREAD OF UNWANTED CODE AND DATA

CROSS-REFERENCE TO RELATED APPLICATIONS

This application is a Rule 1.53(b) continuation of application Ser. No. 12/517,614, filed on Jun. 4, 2009 as a Section 371 of PCT/GB2007/004258 filed on Nov. 8, 2007 claiming the priority of UK Patent Application No. 0624224.2 filed on Dec. 4, 2006 with the United Kingdom Patent Office.

The present invention relates to computer systems and methods of operating such systems for resisting the spread of unwanted code and data. In particular, the present invention is an improvement of the systems and methods described in the Applicant's related GB patent application 0511749.4.

In the past decade, computer systems have increasingly come under attack by unwanted code. The most extreme examples (so far) of unwanted code are computer viruses. A computer virus, like its biological namesake, is capable of infecting one machine and then, from there, infecting others, by commandeering the resources of the email system to send emails containing the virus from one computer to many others, utilising the address book of each computer on which it lands. The resultant wasted bandwidth is an annoyance to users. Further, many viruses perform some unwanted action on each computer on which they land, which may include erasing files for example.

Viruses and other malicious content typically arrive in a separate attachment file, but they may also be hidden in parts of an email, so that they may become active without requiring a user to explicitly detach and execute code. Many applications, such as word processors, spreadsheets and databases, include powerful macro scripting languages, which allow a document/file to include a script capable of performing certain operations. Virus writers have made use of such scripting languages to write macro viruses, so that email attachments that include documents/files may harbour a concealed virus.

Viruses are not the only form of unwanted code. It is common for "free" programs to be distributed with concealed "Spyware" which may, for example, be covertly installed on a user's computer and may subsequently report websites visited or other transactions to a remote computer. Some Spyware will cause the display of unwanted advertising. Some Spyware will attempt to cause a modem to repeatedly dial a high rate number, on which the Spyware writer receives income from a telecoms operator. Other types of harmful code include Malware, Worms, and Trapdoors.

Whilst viruses are self-propagating from one computer to another, other forms of unwanted code are distributed by spam email, by concealed distribution on disc, or, increasingly, by download from an inadvertently visited website. All such types of unwanted code have in common the fact that their existence or their real purpose is concealed from the owners and users of the computers at which they are targeted. Whilst some types are relatively harmless, others have the capacity to wipe out valuable business data and an industry for supplying anti-virus software has therefore developed.

Anti-virus software as it is presently known consists of a program which is executed on the computer to be protected. Such programs typically operate in a monitor mode, in which files to be accessed are checked for viruses at each time of access to the file, and in a scanning mode in which all files in a particular location (such as a disc drive) are scanned. Anti-virus program providers monitor virus outbreaks and, when a new virus is detected, the anti-virus program companies analyse the virus and extract data which can be used to detect the virus. This data is then made available to the computers which run the particular anti-virus program concerned; typically, by providing it on the website of the anti-virus program company for downloading.

Viruses are detected in various different ways. A string of characteristic code forming part of the virus may be stored and incoming files scanned for the presence of that string, which therefore acts as a "signature" or "fingerprint" for the virus. Alternatively, viruses may be detected by their intended behaviour; source code or script files may be parsed to detect predetermined operations which are characteristic of a virus.

Unfortunately, viruses, like their biological counterparts, can easily be "mutated"; minor changes in code, equivalent to the substitution of uppercase and lowercase letters, can change the signature of the virus. The files of data for detecting viruses, by whatever method, are therefore becoming extremely large, and the time taken by antivirus programs is correspondingly increasing as the number of signatures or rules to be checked is growing. Whilst this may be acceptable in virus scanning mode, it is adding an ever-increasing latency to the time taken to access files in monitoring mode. Further, as downloads become larger and are required more frequently, the risk that a user will fail to download necessary updates, and will therefore be unprotected against the most recent (and therefore the most dangerous) virus, is high.

The present invention therefore takes an entirely different approach to protection against unwanted code. According to one aspect of the present invention, there is provided a method of receiving an electronic file containing content data in a predetermined data format, the method comprising the steps of: receiving the electronic file, determining the data format, parsing the content data, to determine whether it conforms to the predetermined data format, and if the content data does conform to the predetermined data format, regenerating the parsed data to create a regenerated electronic file in the data format.

Corresponding computer systems, programs, and media carrying such programs are also provided.

An embodiment of the invention operates to analyse each received file and then reconstitute a substitute file from it. Because the original file is not itself directly stored, or accessed, on the computer to be protected, it is not, itself, capable of harming that computer. It may, for example, be stored in a bit-reversed form or other form in which it cannot be executed. On the other hand, the substitute file will be generated using a generator routine which can generate only "clean" code and data. It is therefore incapable of generating unwanted code matching any code in a received file.

Part of the present invention can be based on a new application of some long-known truths about computer files. The vast majority of files that are imported onto a computer nowadays are in standardised file formats. Proprietary programs create their own file formats (and data intended to be used by those programs most conform to those formats) but there is sufficient demand for exchange of data between different proprietary programs that, firstly, one proprietary program is often supplied with import filters to read data written by another, and, secondly, several formats exist which are not associated with any proprietary program. Examples of such generic formats are ASCII text, rich text format (RTF), hypertext markup language (HTML) and extendible markup language (XML).

Data in files must therefore conform precisely to rigid standards if it is to be read by any application program, and the formats used by different files are widely known. The present inventors have realised that, although the formats used by files permit wide variation, the vast majority of files contain data meeting some relatively narrow pragmatic constraints. For example, most operating systems and applications will accept file titles of great length, but most users, most of the time, use short and easily recognisable file names.

Accordingly, the analysis performed by an embodiment of the present invention can comprise detecting whether data which otherwise conforms to the specification for the purported file type violates pragmatic limits. These 'real world' constraints enable the present invention to detect 'normal' acceptable files. Any file content which does not correspond to pragmatic limits of this type is not passed to the generator program and therefore does not reach the users computer in an executable form.

It will therefore be seen that an embodiment of the present invention operates in a fundamentally different manner to known anti-virus programs. Known anti-virus programs aim to detect viruses, and pass everything which is not detected to be a virus. They therefore always fail to protect the user from the greatest danger; namely, that of unknown viruses. Each new virus that is launched must already have infected a number of computers before it comes to the attention of the anti-virus companies.

Further, even where anti-virus software is installed, and possesses an up-to-date set of detected data, viruses will usually be stored on the hard drive or other media of the protected computer before they can be detected by the anti-virus software. If, for some reason, the anti-virus software fails to run, the virus is in place and can be activated.

US published application US 2003/0145213 discloses a system wherein a macro or malicious code is detected in a file. The file is then reconstructed in a template and the malicious code is removed from the template to provide a clean version of the file.

By way of complete contrast, the present invention need not aim to detect viruses, or even to reject typically virus-like behaviour. Instead, it can reject all incoming files altogether, and substitute in their place, where possible, generated files which cannot contain unwanted code and data. Unwanted code and data can therefore be prevented from ever reaching the hard drive of the computer to be protected in executable form, and cannot be propagated from one computer to another. Furthermore the present invention provides for "zero-day" protection from unknown viruses without the need to maintain an up-to-date database of all known viruses.

At this point, it may be mentioned that US published application 2003/229810 discloses a proposal for an "optical firewall" for protection against viruses. For reasons that will shortly become evident, it is not thought that this system has been put into effect (or that it could be put into effect). It describes a system in which a firewall computer receives a file such as an image file, and displays the image on the display of the firewall computer.

An optical sensor array scans the image and the scanned image is then supplied to the intended recipient. Any viruses that were hidden in the image are not displayed, and consequently, are not passed on in the scanned image. In a variant, a bitmap of the screen may be used instead of an actual screen display.

For various reasons, the "optical coupler" firewall provided in the above mentioned US patent application could not provide an effective and reliable protection against viruses.

For example, reproduction using optical character recognition (OCR) software can provide inaccurate information. Further, reproduction of images using the video technique can provide lower quality images than intended. Also, the computer receiving the incoming file will become infected if the incoming file contains a virus.

On the other hand, by analysing and then re-generating files instead of executing them, displaying them, and optically scanning them, an embodiment of the present invention is capable of providing substitute files which in the vast majority of cases closely emulate the original file (if it is free of unwanted code) so as to make the substitution transparent.

File formats vary in their complexity. At one extreme, text files have a simple format. Files which can contain scripts or macros (such as wordprocessing or spreadsheet files) are of intermediate complexity, whereas files containing code can only be fully analysed by a code parser. Whilst such code analysis is, in the long run, possible according to the present invention, embodiments of the invention may conveniently operate to remove all macros and scripts from document files, and not to pass any files consisting solely of programs, code, macros or scripts.

It will immediately be apparent that there will be frequent occasions when users may wish to receive such files. Accordingly, in a preferred embodiment, the present invention may operate alongside a filter that is arranged to filter files by source, so as always to pass files (or files of a certain type) from certain sources, and to reject such files from others.

Thus, whereas an embodiment of the present invention can block users from receiving code in files from all sources, the parallel filter permits such files from known sources only. Users can therefore receive files from system administrators or certified websites, for example, which would be rejected by the invention. By identifying only those sources from whom a user wishes to receive code, the present invention can block unwanted code.

Because the present invention can operate by detecting conformity with file standards, and typical user behaviour, rather than by detecting viruses, frequent updates are unnecessary; such updates are required only at the point where major changes to a standard gain widespread acceptance, or where user behaviour has substantially changed, both of which are slow processes as compared to the frantic speed with which anti-virus updates must be distributed. Likewise, since the number of tests to be performed remains more or less stable over time, there is no increase over time in the latency for starting programs.

These and other aspects, embodiments and advantages of the invention will be discussed in the following description and claims. Embodiments of the invention will now be described, by way of example only, with reference to the accompany drawings in which:

FIRST EMBODIMENT

Figure 1:
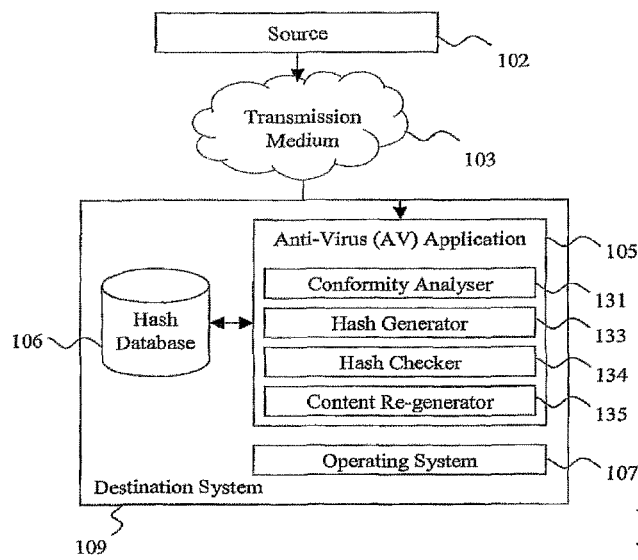
FIG. 1 shows a block diagram of an electronic file system according to an embodiment of the present invention.

FIG. 1 schematically illustrates a basic system layout according to a first embodiment of the present invention. An electronic file is created at a source 102 and is transmitted through a transmission medium 103. The transmission medium 103 may be any suitable medium for transmitting electronic files, for example a hardwired or wireless system or a network. The electronic file passes through the transmission medium 103 in the normal manner until it reaches its destination, hi this embodiment, an AV (anti-virus) application 105 is installed in a destination system 109. The AV application 105 operates such that the data within the incoming electronic file is not allowed to enter the operating system 107 of the destination system 109 until it has been analysed and re-generated if the data is determined to be allowable. As will be discussed below, some portions of the received electronic file may be analysed against a predefined allowable format and for other portions of the received electronic file, a hash may be generated and looked up in a hash database 106 of previously identified non-malicious content. The AV application 105 includes a conformity analyser 131, a hash generator 133, a hash checker 134 and a content re-generator 135 for determining whether the electronic file 101 is to be allowed to pass through to the operating system 107 and for re-generating allowable content.

Figure 2:
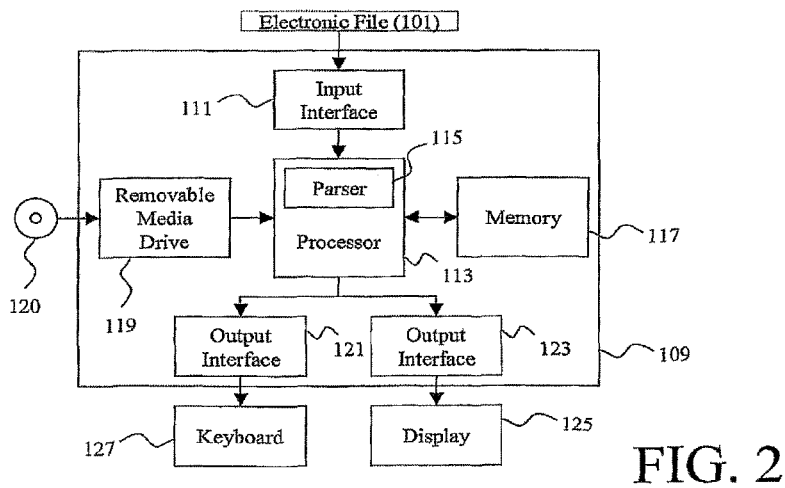
FIG. 2 shows a computer system adapted for use in embodiments of the present invention.

FIG. 2 is a block diagram illustrating a computer system adapted to implement the destination system 109 shown in FIG. 1. The system 109 receives an incoming electronic file 101 at an input interface 111. The input interface 111 is connected to a processor 113, which is arranged to carry out various processes on the received file. The processor 113 includes a parser 115 for parsing content in the received electronic files 101. The processor 113 is further connected to a memory device 117 and a removable medium drive 119 for reading data from or writing data to a removable medium such as a CD 120 or a floppy disk (not shown). The processor 113 is also connected to a number of interfaces (121, 123) to enable connections to be made to output devices such as a display 125 and keyboard 127.

So that incoming executable files are not allowed to automatically run as they enter the AV application, the system arranges for the data making up the incoming electronic files to be stored in memory in any suitable scrambled format.

In this embodiment, the scrambling method reverses the order of the bits in a byte. That is, bits 0 to 7 are received in order, but are stored in a bit reversed manner such that bit 0 is switched with bit 7, bit 1 is switched with bit 6, bit 2 is switched with bit 5 and bit 3 is switched with bit 4. Therefore, as an example, a byte comprising 1 0 1 1 0 0 0 0 would be stored in the following order: 0 0 0 0 1 1 0 1. In this manner, any executable code is not able to automatically run and so any infected electronic files are not able to infect the AV application or the destination operating system.

Figure 3:
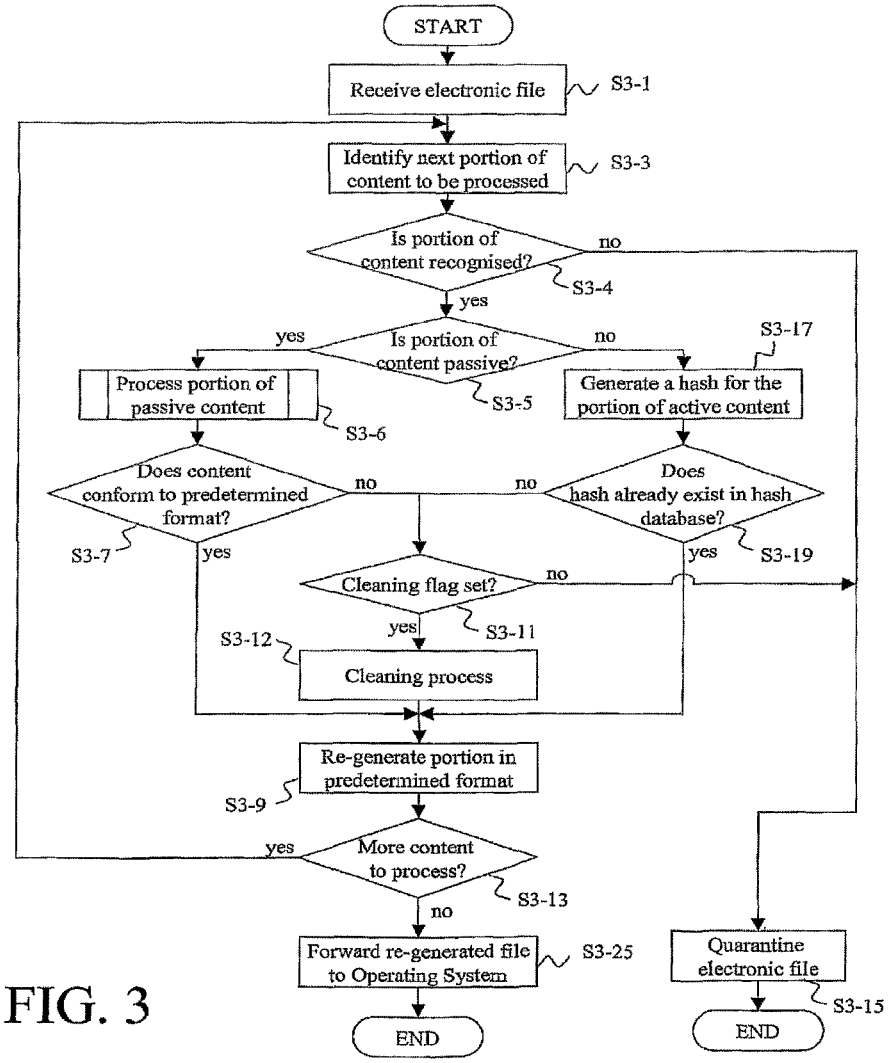
FIG. 3 shows a flow diagram of a process according to an embodiment of the present invention.

FIG. 3 is a flow chart illustrating the processing steps carried out by the AV application 105 in this embodiment in order to determine whether an electronic file 101 is allowed to pass through to the destination operating system 107. At step S3-1, the electronic file 101 is input into the AV application 105 using any suitable means and received by the AV application 105. The input means may vary depending on the type of electronic file 101 being received and the medium over which it is being transmitted. In this embodiment, the electronic file 101 is accepted into the AV application.

In this embodiment, the electronic file 101 received by the system 109 includes one or more portions of content data which is to be analysed by the AV application 105. The portions of content data may be passive content data which is content of a data type having a fixed purpose, for example, text, image, audio or video content data. Alternatively, the portions of content data may be active content data such as scripts, macros or executable code.

In this embodiment, the AV application is designed to only allow through passive content data that conform to one of a plurality of stored known, allowable, pre-defined formats, and to only allow through active content data which has been identified as non-malicious. As an example, an electronic file may consist of content data encoded and arranged in accordance with a file type specification comprising a particular set of rules, each type of file (text, HTML, XML, spreadsheet and so on) having an associated set of rules. Common file types are sometimes indicated by the suffix of the file name (e.g. .pdf, .txt, .doc), and also or alternatively by the first few bytes of data in the file. Many file types include a header indicating something about the structure of the file, followed by the content data (e.g. text, numbers, audio or image data, scripts, macros). An electronic file 101 may contain a plurality of portions of content data, some of the portions being passive content and some of the portions being active content.

The passive content data may include parameters (for example, tags to indicate that the content data is to be presented in bold). The rules making up the file type specification may specify the values or range that such parameters can take on. They may also specify, for example, the allowable values or range of values that the passive content data can take on.

As those skilled in the art will appreciate, it is known for an application program capable of opening a file of a particular type to include a parser for applying the rules making up the file type specification to a file, to extract the content data for presentation or processing. For example, a word processing application may be capable of opening files in its proprietary file format (e.g. Microsoft Word™), the proprietary file formats of other word processing applications, and generic file formats such as Rich Text Format (RTF), ASCII and HTML. An application program capable of storing passive content data as a file of a particular type includes a generator for applying to passive content data the rules making up the file type specification to generate a file in the required format.

In the present embodiment, for each file type, a predetermined format is stored. The predetermined format generally includes rules making up the file specification. However, the predetermined formats only include the rules relating to frequently used parts of the format. Additionally, the predetermined formats include additional rules constraining the values and/or ranges that content and parameters can take on, so as only to include commonly and frequently used values and ranges. Thus, only those parts of a file of a given type of passive content and which consist exclusively of frequently or commonly occurring data and parameters can be analysed according to the corresponding stored predetermined format of this embodiment.

Examples of components of data types of passive content that are not allowed to pass through the system (because the predetermined formats do not include the rules relating thereto since they are infrequently used) are I-frames in HTML pages and General Encapsulation OBject (GEOB) tags in MP3 files. Examples of infrequently used data values that are not allowed to pass through the system (because the predetermined formats are limited to values that exclude them) are control characters in an ASCII file other than the commonly-used TAB, CR/LF and LF characters.

The content data may also be active content data. As an example, the received electronic file 101 may be an HTML page including a number of passive content data portions containing standard HTML tags and associated text content and at least one active content data portion containing an executable script, such as a Javascript or VB script function. The active content data may also be determined from the particular set of rules associated with the received electronic file 101. For example, the set of rules for HTML documents will include a definition of a "<javascript>" tag which is used to define a portion of the HTML file as Javascript executable code. As another example, the particular set of rules for a Microsoft Word file/document defines a directory structure of sub-file and sub-directories contained within the particular Microsoft Word file. One specific sub-directory labelled "VBA" is used to define a macro within a Microsoft Word file. A file "_VBA_PROJECT" is another example of a sub-file defining a portion of active content. Other sub-files with non-standard names may be listed in the "PROJECTwm" file defining further portions of active content within the Microsoft Word file.

Accordingly, at step S3-3, the processor 113 identifies a next portion of content to be processed, this being the first portion of content in the received electronic file 101 the first time an electronic file 101 is processed. In this embodiment, the way in which portions are identified depends on the structure of the electronic file as defined by the file type specification. Therefore, depending on the type of file that is received, the processor 113 processes the received electronic file 101 to identify a next portion of content according to the particular set of rules associated with the file type specification of that type of file. For example, the file type specification for a JPEG file comprises a set of rules defining a number of tags for including information about a JPEG image. As another example, HTML files consist of content data arranged in accordance with a particular set of rules defining a different set of tags for components of the HTML file.

At step S3-4, the processor 113 determines if the currently identified portion of content is recognised as corresponding to a portion identified by the particular set of rules associated with the type of the received electronic file 101. If the processor 113 determines that the portion of content is not recognised as being defined by the particular file type specification, then at step 3-15, the received electronic file 101 is blocked at step S3-15 by placing the electronic file in quarantine. The received electronic file 101 will therefore not be re-generated in any form and processing of the file terminates.

On the other hand, if the processor 113 determines that the portion of content data is recognised, then at step S3-5, the processor 113 determines if the currently identified portion of content is passive or active content data. Again, in this embodiment, the processor 113 makes this determination from the particular set of rules associated with the received electronic file 101 as discussed above.

If the processor 113 determines at step S3-5 that the portion of content is passive content data, then at step S3-6 the conformity analyser 131 is used to process the portion of passive content data to determine if the portion of content conforms to a predetermined format as discussed above. As those skilled in the art will appreciate, an identified portion of passive content may include a plurality of sub-portions each having a different associated predetermined format. In such a case, the conformity analyser 131 may be called recursively at step S3-6 to process each sub-portion in turn to determine if each sub-portion conforms to a respective predetermined format. If, at step S3-7, the conformity analyser 131 determines that the electronic file is in the format it says it is, and that all parameters conform to the predetermined format associated with that particular electronic file type, then at step S3-9, this allowed portion of passive content data is passed to the content re-generator 135 for re-generation. In this embodiment the content data re-generator 135 is used to re-generate a substitute file from the portions of allowed content data in a predetermined format associated with the original received electronic file type.

The processing then continues to step S3-13 where processor 113 determines if there is any further content to process. If it is determined that there is more content to process, then the processor 113 returns to step S3-3 to identify the next portion of content to be processed.

If, at step S3-7, the conformity analyser 131 determines that the portion of passive content does not conform to any predetermined format, then, at step S3-11, the processor 113 determines if a cleaning mode flag has been set in the AV application 105. In this embodiment, the process of cleaning a received electronic file 101 so that non-conforming portions of the electronic file 101 are not re-generated may be controlled by a flag set in memory 117. The cleaning mode flag may be set to true to enable the cleaning process at step S3-12 so that non-conforming portions of a received electronic file 101 are removed or cleaned and are not present in the re-generated file. In this cleaning process, any segment or part of a file containing unknown functionality is therefore removed whilst still providing the user with a usable re-generated file. On the other hand, the cleaning flag may be set to false to disable the cleaning process. If the cleaning process is disabled, then if any part of a message or electronic file is determined to be non-conforming, then that electronic file may be blocked entirely and will not be re-generated in any form.

If the cleaning flag has been set and the cleaning process has been performed at step S3-12, then processing passes to step S3-9 where the content re-generator 135 is used to re-generate a clean portion in the re-generated file corresponding to the non-conforming portion of the received electronic file 101. In this embodiment, the resulting clean portion may include, for example, the tags of the associated portion without the non-conforming data from the original electronic file. Alternatively, tags may be inserted such that the resulting file remains in a predetermined format associated with the original received electronic file type. Once the clean portion has been re-generated in a predetermined format, then at step S3-13, the processor 113 determines if there is any further content to be processed as discussed above. In the embodiment illustrated in FIG. 3, if an identified portion of passive content data contains a plurality of sub-portions, the conformity analyser 131 will recursively process each of the plurality of sub-portions at step S3-6 in order to determine at step S3-7 whether or not the entire portion of passive content data conforms to a predetermined format. As an alternative, it may be possible to perform a cleaning process for each sub-portion that the conformity analyser 131 determines does not conform to a predetermined format.

The above description of steps S3-7 to S3-15 is related to the processing of a passive portion of content data in the received electronic file 101. However, as discussed above, the portions of content data may be active content data. Accordingly, if the processor 113 determines, at step S3-5 described above, that the current portion of content is active content data, then at step S3-17, the hash generator 133 is used to generate a hash for the portion of active content. At step S3-19, the hash checker 134 checks the hash database to see if the generated hash already exists in the hash database 106. If the hash already exists in the hash database 106, then the associated portion of active content has previously been identified as non-malicious, and the allowed active content is passed to the content re-generator 135 at step S3-9 and re-generated by the re-generator 135 as discussed above. On the other hand, if at step S3-19 it is determined that the hash does not exist in the hash database 106, then at step S3-21, the processing passes to step S3-11, where the processor 113 determines if the cleaning process is to be performed for this portion of active content data or if the electronic file is to be blocked, in the same way as discussed above. The processing then continues to step S3-13 where processor 113 determines if there is any further content to process. If it is determined that there is more content to process, then the processor 113 repeats steps S3-3 to S3-21 until all portions of the received electronic file 101 have been processed and re-generated, if the portions are allowed content data.

Once processing of all portions of the received electronic file 101 is complete, then at step S3-25, the re-generated electronic file is forwarded to the operating system 107 of the destination system 109 in order for it to be processed in a normal manner. All passive content data that can be extracted from the file using the rules making up the predetermined format and all active content data which has been identified as non-malicious is extracted and re-generated, and any parts that cannot be extracted cannot therefore be re-generated.

In this manner, due to the conformity check and re-generation of the file, viruses are unable to enter and infect the operating system; in fact, nothing but passive content data in a commonly occurring format and non-malicious active content is extracted and consequently regenerated.

As those skilled in the art will appreciate, when non-conforming portions of the received electronic file 101 are not re-generated, the content re-generator 135 of the AV application 105 may insert relevant warning text in the re-generated electronic file informing the recipient that part of the message was not allowed through. As an option, this warning text may indicate the reasons for not allowing the portions through.

Further, a sub-part of a portion of passive content in the electronic file 101 may also be blocked, i.e. not regenerated and preferably erased, if it does not conform to the allowable predetermined format for that part. That is, for example, if a string of characters in an ASCII electronic file includes a control character (e.g. the 'BEL' character), this string of characters may be replaced with a text warning inserted by the AV application 105 informing the intended recipient that the string has been left out of this part of the re-generated electronic file because the part does not conform to the predetermined format. The conformity analyser 131 does not specifically look for the control characters that are not allowed (e.g. the 'BEL' character), but instead passes only those control characters which are allowed, as defined by the predetermined allowable format.

Registering the Hash

In the above description, the hash database 106 contains hash values for active content data which has previously been analysed and indicated as good or non-malicious. As those skilled in the art will appreciate, such a database requires continual maintenance to keep it up-to-date with newly encountered scripts, macros and executable code which are non-malicious so that the present system and method can be most effective. A brief description will now be given of how such newly encountered active content data is analysed for inclusion in the hash database 106 during an administrative mode.

In this example, the destination system 109 shown in FIG. 1 is a web proxy server which receives a request from a system administrator to register scripts in an HTML page. In this example, the system administrator transmits the HTML page with the scripts to be registered as an HTTP request to the web proxy server 109 on a different port to usual web surfing, for example port 8181. Using a different port differentiates the request from normal web traffic and also makes registering scripts more secure as access on this port could be restricted by firewalls. Although using such a unique port allows the web proxy server 109 to know that a system administrator is requesting to register scripts, additional security may be employed by performing extra authentication checks such as restricting the IP addresses that are allowed and using a password.

Once authentication is completed successfully, the web proxy server 109 passes the request onto the Internet and waits for a HTTP response which is subsequently received back by the web proxy server 109. The web proxy server 109 will mark the received response as a register request rather than a normal surfing response and the response will then be passed to the AV application 105. The received response, which in this example is the HTML page with the scripts to be registered, is handled by the AV application 105 in a similar way as described above with reference to FIG. 3, with the exception that in this example, the AV application 105 is configured to operate in a registration mode instead of the normal checking mode described above, because the received file is marked as a register request.

In the registration process, the conformity analyser 131 checks that the HTML portions of the received file conform to the HTML specification and have reasonable values. On processing the Javascript portions of the received file, the hash generator 133 creates a hash for a particular Javascript function and the AV application 105 checks if the hash is present in the hash database 106. If the script was previously registered, then no further action is necessary for that particular script. However, if the script is not present in the hash database 106, then the AV application 105 will gather information about the particular script which will be presented to the system administrator in order to make a decision about whether this script should be registered. In this example, an HTML form will be generated for display to the system administrator, for the system administrator to indicate which scripts should be registered in the hash database 106. In order to build the HTML form, a data structure is used to collect all the hashes that could be registered for the HTML page being processed. In order for the system administrator to be provided with sufficient information to make an informed decision, in this example, the full text of the function is included in the data structure along with the generated hash. Once the AV application 105 has processed all portions of the received HTML file, such that the data structure is populated with the hashes and functions to be reviewed by the system administrator, each entry in the data structure is formatted into an entry in an HTML form. After all the entries in the data structure have been processed into the HTML form, the form is then sent to the system administrator who can indicate which of the newly encountered scripts are non-malicious and therefore can be included in the hash database 106. Once a register response is received from the system administrator, the hashes for the indicated scripts are added to the hash database 106.

Development Phase

The foregoing has been a description of a system and method of processing file data and re-writing the file with known good data, which is data that is compliant with the file format specification and pragmatic and other specified limits or which has previously been identified as non-malicious data, so that the recipient of the file can be assured of receiving non-malicious data. A number of issues arise during testing and development of the AV application 105 in order to ensure continuing operational correctness throughout the deployment stage. These aspects will now be described.

Two Pass Error Detection

There is potential during this re-writing process that an implementation error could itself produce a re-generated file that is not compliant to the file format specification and pragmatic and other specified limits which the above described system and method is supposed to enforce. Therefore, during development of the content re-generator 135, it is necessary to test the re-generated files to ensure continuing operational correctness throughout the deployment stage.

Figure 4:
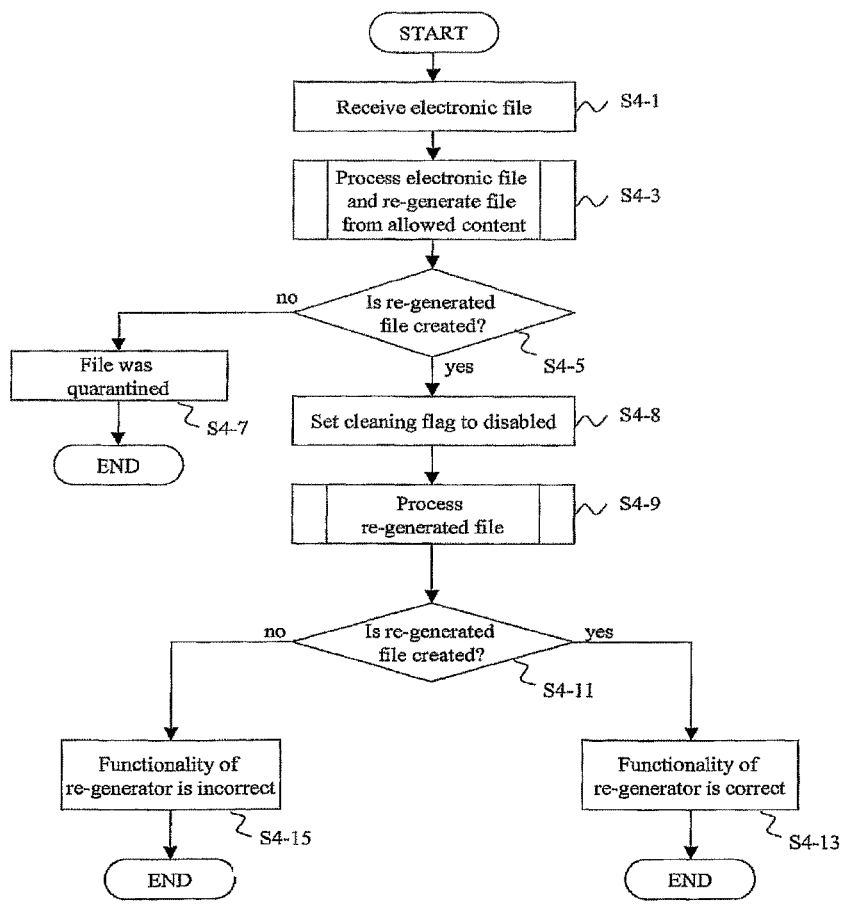
FIG. 4 shows a flow diagram of a development and testing method according to an aspect of the present invention.

FIG. 4 is a diagram illustrating the processing during this development and testing phase for the re-generator 135. As shown in FIG. 4, testing of the re-generator 135 begins with the input of an electronic file at step S4-1. This is similar to the step of receiving an electronic file in step S4-1 described above with reference to FIG. 3. At step S4-3, the processor 113 processes the electronic file to determine allowed content in the electronic file and consequently to re-generate a file in a predetermined format. The processing steps carried out at step S4-3 are as described above with reference to FIG. 3. As discussed above, the result of the processing as shown in FIG. 3 is either that a re-generated file is created (at step S3-25) or that the electronic file is quarantined (S3-15). Accordingly, at step S4-5, the processor 113 determines if a re-generated file has been created and if not, it is determined at step S4-7 that the current electronic file does not conform to a predetermined format and has therefore been quarantined.

On the other hand, if a re-generated file has been created, then at step S4-8, the cleaning flag is set to disabled so that when the re-generated file is processed in a second processing pass at S4-9, the processing will fail immediately upon encountering any content which does not conform to a predetermined format or pragmatic or other specified limit. The steps performed at step S4-9 are those as described above with reference to FIG. 3. At step S4-11, the processor 113 again determines if a re-generated file is created. If the processing of step S4-9 results in the creation of a re-generated file, then this confirms at step S4-13 that the functionality of the re-generator 135 is correct. On the other hand, if no re-generated file is created by the processing at step S4-9, then this indicates at step S4-15 that validation of the re-generator 135 has failed.

Therefore, if any errors are introduced during the re-generation step of the first processing pass at step S4-3, these will be present in the re-generated file which is passed to the second processing pass at step S4-9. These errors will then be highlighted by the second processing pass as the re-generated file with errors does not conform to the file format and pragmatic or other specified limits enforced by the present system and method.

A concrete example of this error detection during the development and testing phase will now be described. In the following example, an MP3 music file is processed by the method described above. Generally within such MP3 files, there are various tags which contain extra information relating to the particular music file and which are separate from the encoded music data. One such MP3 tag is the "TCOM" tag which details the information relating to the composer of the music data content of the particular MP3 file.

Figure 5:
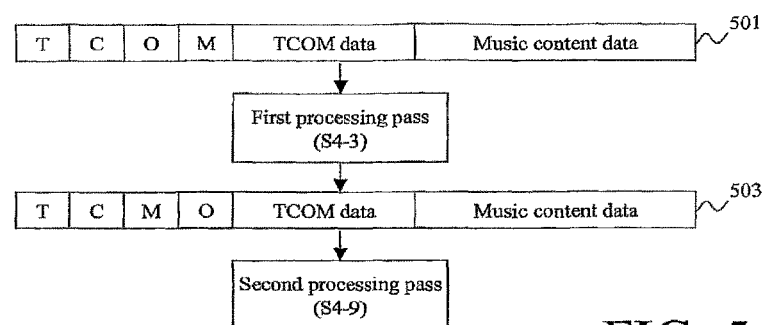
FIG. 5 is a schematic illustration of an example of the development and testing method shown in FIG. 4.

FIG. 5 schematically illustrates an example of an MP3 music file being processed in accordance with the two pass testing and development method. The exemplary MP3 file 501 schematically illustrated in FIG. 5 as stored in an un-swapped raw data memory buffer, includes a tag "TCOM", the TCOM data and music data content. The MP3 file 501 is read by processor 113 during a first processing pass as described above at step S4-3. In the example shown in FIG. 5, an implementation error in the re-generator 135 causes the "TCOM" tag to be re-written incorrectly to an output buffer, such that the re-generated MP3 file 503 contains an invalid tag "TCMO". As a result, this tag does not conform to the MP3 file format specification and consequently, when the re-generated file 503 is processed during the second processing pass at step S4-9, the illegal "TCMO" tag will be encountered and the re-generated file 503 will be quarantined. As a result of the failure to re-generate a file on the second pass of the process, this provides an indication that the re-generator 135 is not correctly re-generating the electronic files during the first processing pass.

Faultsplit

Another issue during development of the present system and method is that the process must be tested on numerous electronic files in order to gather information about known good files and to generate the database of known non-malicious data file formats and pragmatic and other specified limits. The process of examining electronic files typically relies on a product developer processing each filed in a development mode, and evaluating the output to determine the required action. This process requires considerable resources.

In order to overcome this problem, a development and testing method has been devised which effectively automates the examination process and aids the product developer in the evaluation of the outputs. According to the method, the processing iterates through a directory of gathered files and performs the processing and re-generating steps of FIG. 3 on each of the files within the directory. As the process is operated on each of the files within the directory, the processing returns a status code and failure string detailing any reasons for blocking the file or placing the file in quarantine. Every possible failure reason resulting from the processing will return an appropriate error code and reason string. The present development and testing method uses these return strings to create sub-directories' having the error code and reason string as the sub-directory name. The method also moves each corresponding file to the respective sub-directory depending on the error code and reason string. Once processing of all the files is complete, the product developer can quickly view a list of all the reasons why the processing is blocking files or placing files in quarantine. Furthermore, the product developer is able to ascertain the relative importance of these reasons by looking at the number of files within each sub-directory. In this way, the product developer is able to focus his efforts on the failure reasons that are causing the most stoppages.

Figure 6:
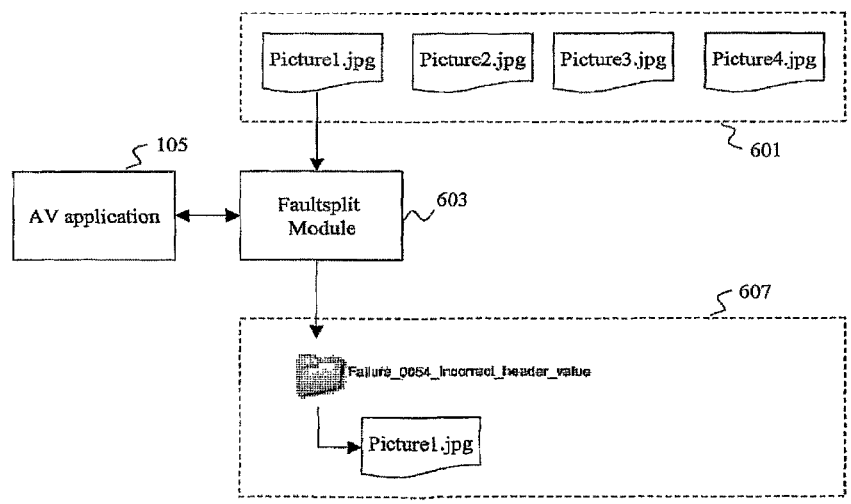
FIG. 6 is a schematic illustration of another development and testing aspect of the present invention.

FIG. 6 is a schematic illustration of this development and testing process. FIG. 6 shows a directory of JPEG image files 601 which are to be processed by the faultsplit development and testing module 603. Each file within the directory 601 is passed to the AV application 105 which operates on each of the files as is described above with reference to FIG. 3. When the processing of each particular file is complete, the AV application 105 returns a status and reason if there was a failure in processing the particular file.

In the example shown in FIG. 6, the AV application 105 found an error 0054 with the reason string "incorrect header value" when processing the file "picture1.jpg". This error code and reason string are returned to the faultsplit module 603. In response, the faultsplit module 603 determines if a sub-directory already exists with the same error string, and if so, the corresponding file is simply copied into that sub-directory. In the example shown in FIG. 6, there are no other sub-directories and therefore the faultsplit module 603 creates a new sub-directory 607 with the name of the error string "failure_0054_inncorrect_header_value". Once the sub-directory 607 is created, the corresponding file "picture1.jpg" is then copied into this sub-directory 607.

The faultsplit module 603 processes each of the files in the original directory 601 until all of the files in the directory have been processed. In this way, once the development and testing process is complete, the directory structure 607 will contain sub-directories for every error code encountered while processing of the file in the original directory 601, with the corresponding files copied to respective sub-directories.

SECOND EMBODIMENT

In the following described second embodiment, which is similar to the first embodiment, the electronic files are e-mails transmitted over the Internet, from an originator to a destination device which in this embodiment is an Internet Service Provider (ISP). The ISP forwards the e-mails to an e-mail client server, where upon receipt, the e-mail client server forwards the e-mail to the intended recipient's Inbox.

Figure 7:
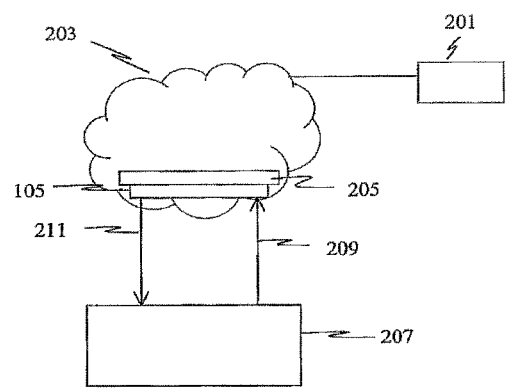
FIG. 7 shows a block diagram of an e-mail system according to a second embodiment of the present invention.

FIG. 7 shows a layout of an e-mail system according to this embodiment in which the AV application of the present invention is incorporated. An e-mail is forwarded by a sender from a source location 201. The e-mail is forwarded via the Internet 203 to an Internet Service Provider (ISP) 205, determined by the domain name incorporated within the e-mail. A recipient's e-mail client server 207 is connected to the ISP 205 through direct open connections. The first connection is a Simple Mail Transfer Protocol (SMTP) outgoing connection 209 for forwarding outgoing e-mail from the e-client server 207 to the ISP 205. A second connection is a POP (Post Office Protocol) incoming connection 211, which retrieves e-mail from the ISP 205.

The AV application 105 is situated at the ISP 205. The AV application 105 resides on the input/output ports connected to the recipient's e-mail client server 207, in order to analyse all outgoing and incoming e-mails being sent and received by the e-mail client server 207.

In this embodiment, the AV application 105 is a piece of computer code, which is implemented using known computer programming techniques. All e-mails that are sent to the e-mail client server 207 must pass through the AV application 105 before the e-mails are able to enter the e-mail client server 207. Likewise, all e-mails forwarded by the e-mail client server to the ISP 205 must pass through the AV application 105 prior to entering the ISP 205.

The AV application 105 analyses the incoming e-mail message by parsing the data as it enters the application. As in the first embodiment, the data is stored in a scrambled mode in order to stop any executable files from coining. The AV application 105 determines if the separate parts of the incoming e-mail conform to a predetermined allowable format, and, if the part does conform, it re-generates each part of the e-mail message. Therefore, any virus within any e-mail is not allowed through to infect the recipient's system, nor pass from the recipient's system to the ISP.

As discussed in the first embodiment, a conformity analyser 131 is used in this embodiment to analyse each specific data type to see if it conforms to a pre-defined format for that data type and extract that content data which does conform. A content re-generator 135 then regenerates the data using the pre-defined allowable format for that data type. In this embodiment, each type of data is analysed and re-generated by its own specific conformity analyser and content re-generator.

Each conformity analyser 131 runs a specific set of rules on the data depending on the type of data received. The rules are defined by the official pre-defined specification for the file type, and real world commonly occurring (and hence safe) examples of known data types. Generally the rules allow only a subset of files which conform to the file type specification, but they may relax certain rules of the official specification where these are commonly breached. For example, email addresses should contain no spaces, but some popular email applications breach this rule, so that emails which violate the specification in this regards are common, and thus the predetermined format for analysing emails according to this embodiment accepts e-mail addresses which contain a space, and thus the embodiment analyses and extracts such email addresses.

Also, the conformity analysing device may check a certain parameter within a data file. For example, if the header states that the file is an RTF (Rich Text Format) file, then in accordance with the RTF file format specification, the first few bytes of data are read to determine if this is correct.

Figure 8:
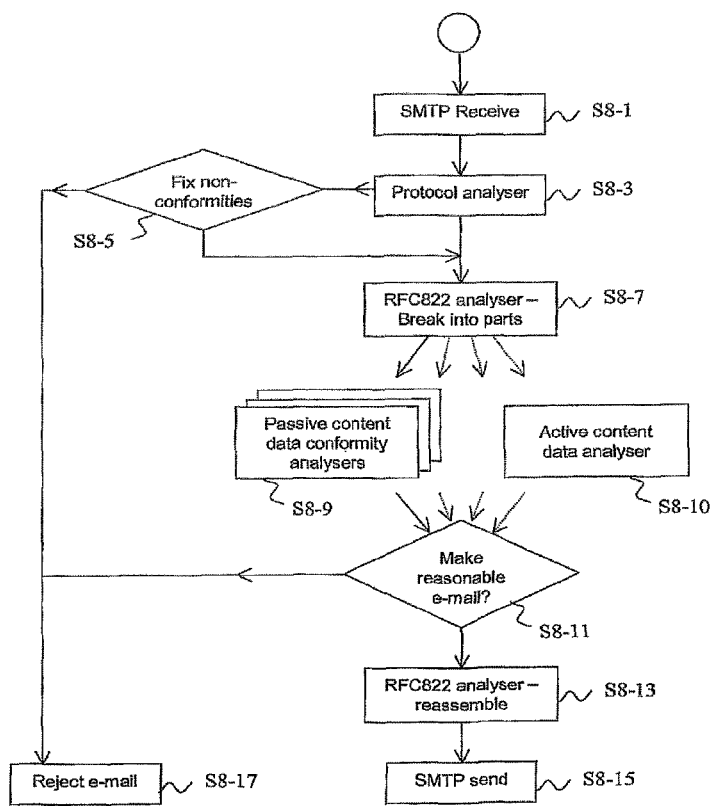
FIG. 8 shows a flow diagram of a process according to a second embodiment of the present invention.

FIG. 8 shows a flow diagram of how a system works that incorporates an AV application according to this embodiment. As can be seen in FIG. 8, at step S8-1, the e-mail is received at the ISP over the SMTP incoming connection.

At step S8-3, a protocol conformity analysing device carries out a process to read the incoming e-mail's basic format, and regenerate the e-mail so that it conforms to the basic e-mail protocols. An e-mail reader that is non-conformant reads the e-mail. The read data is then passed to an e-mail writer that does conform to basic e-mail protocols. In this manner, common non-conformities are converted into a conforming e-mail. For example, if a recipient's e-mail address is badly formed, the e-mail writer re-writes it so that it does conform (e.g. by removing spaces or inserting a closing angle bracket at the end).

A further example is when an e-mail message is received without a 'From:' header. In this case, the e-mail message is encapsulated in a whole new e-mail message including a 'From:' header.

Other parameters within the e-mail are also made to conform. For example, line length, correct ASCII character codes being used, correct Base 64 coding being used where appropriate, intact header information ('To:', 'Subject:' etc.), a space between the header and the body of the e-mail, and so on.

If the e-mail is so badly formed that part of it cannot be rewritten, then it is determined whether a reasonable e-mail still exists if the non-conforming part were missing. If it is determined that the process will still result in a reasonable e-mail, the e-mail is rewritten with the non-conforming part missing. A warning text may be inserted in its place.

Also, the protocol conformity analysing device may reject the whole e-mail. For example, if the protocol conformity analysing device detects that non-conforming base 64 encoding is being used on a large piece of data within the e-mail, the e-mail is completely rejected at step S8-17.

If the protocol conformity analysing device determines that the e-mail does conform to e-mail protocols, it is regenerated by the protocol conformity analysing device and passed on to the next step in the process.

All e-mails should conform to the current RFC standard for e-mail (i.e. RFC 822 and its successors). This standard defines how the e-mail is formed. After the e-mail passes through the protocol conformity analysing device, the RFC 822 conformity analysing device checks to see if the e-mail conforms to the RFC 822 standard. The RFC 822 conformity analysing device carries out this conformity check by first breaking the e-mail up into its separate component parts by finding the boundaries within the e-mail (as discussed below), and then parsing each component part of the e-mail to see if it conforms to RFC 822.

It will be understood that updates would be required when the RFC standard is updated to ensure that the RFC 822 conformity analysing device is able to check the conformity of all known data types.

Figure 9:
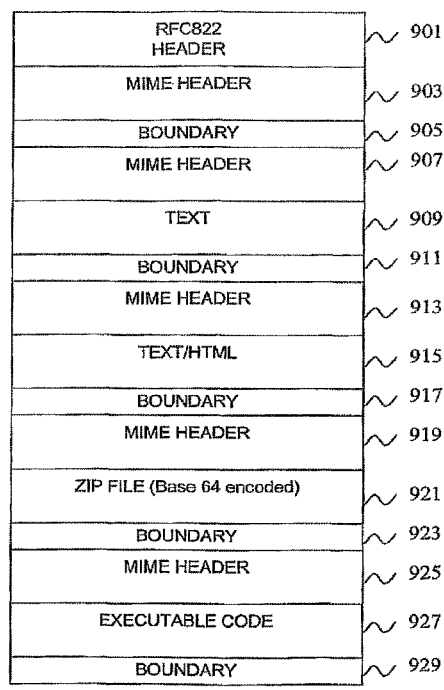
FIG. 9 shows an example layout of the different parts forming an e-mail.

As is well known, an e-mail is made up of a number of separate parts, as shown, for example, in FIG. 9. The e-mail starts with an RFC 822 header 901, which defines a number of fields, such as 'From:', 'To:' and 'Subject:' etc. Next is the MIME header 903, which defines a number of fields for use in the extension protocol, such as 'Content-Type:' that defines the text used to indicate the boundary between the different parts of the e-mail.

After the headers (901 & 903), the first boundary 905 is indicated. The next part of the e-mail starts with a further MIME header 907, which defines the format used in this part. In this example this part comprises text matter to be displayed in a text format. The block of text 909 therefore follows. At the end of the text block 909 is a further boundary 911.

A further MIME header 913 indicates what format the next part of the e-mail will be in. In this example, the next part of the e-mail is a mixed text and HTML formatted block 915. A further boundary 917 indicates the end of that part to the e-mail.

For the next part of the e-mail, a MIME header 919 indicates the data type for an attachment to the e-mail, which in this case is a ZIP file. The ZIP file 921 is base 64 encoded and added to the e-mail. A further boundary 923 then indicates the end of the ZIP file block.

For the final part of the e-mail, a MIME header 925 indicates the data type for another attachment to the e-mail, which in this case is a portion of executable code. The executable code 927 is an example of a portion of active content data within the e-mail. The final boundary 929 then indicates the end of the block of executable code.

At step S8-7 in FIG. 8, the RFC 822 conformity analysing device parses the ASCII characters forming the e-mail using a parser. The RFC 822 conformity analysing device is then able to detect the boundaries in the e-mail and check to see if certain parameters conform to a known acceptable predetermined format. For example, the RFC 822 conformity analysing device checks the line length to see if it conforms to the RFC 822 standard and so only line lengths of 2000 or less are regenerated.

Further checks can be made to see if the parsed data within the e-mail conforms to the RFC 822 standard. For example, it is checked whether the characters within the e-mail are known acceptable ASCII characters as defined in the standard, whether the information in the header is as defined in the standard and whether the header length conforms to the standard definition. These checks listed are merely examples of a large group of different checks the RFC 822 conformity analysing device carries out (the rest of which will be apparent to one skilled in the art), and as such, this invention is not limited to those listed above.

As well as analysing the parsed data to see if it conforms to the basic RFC 822 standard, the RFC 822 conformity analysing device also checks to see if certain parameters conform to real world examples of RFC 822 standard e-mails. That is, the specification of certain parameters may be left open for users to define, whereas, in the real world, only reasonable values would be used. For example, an e-mail would usually only comprise a minimal number of parts. So, if an e-mail is received that includes 1000 boundaries, this would not be a real world example of RFC 822 standard e-mails, and so would be blocked, i.e. not regenerated and preferably erased, by the RFC 822 conformity analysing device.

For each component part of the e-mail comprising data that needs further conformity checking, a determination is made by the AV application as to whether the component part consists of passive or active content data, as discussed above in the first embodiment. If the component part is determined to be passive content data, then at step S8-9, the component part is forwarded in parallel to a separate passive content data conformity analysers depending on the type of data the part corresponds to. That is, if the e-mail part being analysed is defined as text, the ASCII characters making up the text are forwarded to a text conformity analysing device. If the e-mail part being analysed is defined as a TIFF file, the characters making up the TIFF file are forwarded to a TIFF conformity analysing device.

At step S8-9, each of the passive data conformity analysing devices analyses the data forwarded to it to see if it conforms to its purported format. If the data does conform it is regenerated by the conformity analysing device. If any non-conformity is within the data, the data is either left out, or, if possible, regenerated by the conformity analysing device so it does conform. One example of regenerating the data so it does conform is that of adding nested brackets in an RTF file wherever they are missing.

If an e-mail comprises a nesting of different types of data, passive data conformity analysers are recursively called, so that several specific devices are run in sequence and each being put on hold at each point that a further type of data is discovered. In this manner, an e-mail with a zip file, that includes a word processing document, which includes a JPEG picture file could run through the sequence of different conformity analysing devices (zip, word processing, JPEG) in order to drop down through the nesting of files and analyse each file in sequence.

If, on the other hand, a determination is made by the AV application that a component part consists of active content data, then at step S8-10, an active content data analyser analyses the data to determine if the script, macro or executable code is non-malicious. The processing performed by the active content data analyser generates a hash for the active content and determines whether or not the hash is present in the hash database. This processing has been described above in the first embodiment.

At the end of the analysis, the file is reassembled using the conforming regenerated parts. Upon a determination at step S8-11 that enough parts of the e-mail have been regenerated to form a suitably coherent, understandable and worthwhile e-mail, the data is reassembled using the RFC 822 conformity analysing device using the regenerated parts, as shown at step S8-13. This ensures that the regenerated e-mail is forwarded in the correct format. The AV application then forwards the re-generated e-mail to the intended recipient using the SMTP protocol, as indicated in step S8-15.

However, if the AV application determines at step S8-11 that not enough parts of the e-mail have been regenerated to form a useful e-mail, the e-mail is rejected at step S8-17. During step S8-17, warning text is forwarded to the intended recipient of the e-mail informing him/her that an e-mail intended for him/her was rejected by the system. The warning text may include details of why the message was deleted and further information intended to help the recipient identify either the sender, or the reason why the e-mail was rejected.

Described in detail below are some example passive content data conformity analysers for use in this embodiment, which could be used during step S8-9. For example, if the component part of an e-mail purports to be text data, based upon the information in either the RFC 822 header, MIME header or the file extension, the text component part is passed to a text conformity analysing device. The text conformity analysing device parses the text data to determine if it conforms to its predetermined allowable format as described below.

As there are a number of different types of text file, such as, for example, Comma Separated Variable (CSV) and Rich Text Format (RTF), the text conformity analysing device must first differentiate what type of text file the parsed data is purporting to be. All files attached to e-mail will have a file extension associated with it that indicates what the file type should be. The text conformity analysing device analyses the parsed file extension within the MIME header to determine if the text file is a pure ASCII file. If so, it is only necessary to use an ASCII conformity analysing device, as described below.

However, if the text conformity analysing device, upon analysis, determines that the text file is a file type other than pure ASCII, for example a CSV file, then a CSV conformity analysing device will also be called up to analyse and regenerate the CSV data. Firstly however the ASCII conformity analysing device analyses the ASCII characters making up the text file within the e-mail to see if the text string conforms to the ASCII predetermined format, and, if there is conformity, regenerates the ASCII file.

The ASCII conformity analysing device parses the data to ensure the file conforms to the minimum ASCII pre-defined format. For example, the ASCII conformity analysing device only allows the ASCII characters 32 to 127, and four control characters, 'line feed' (LF=10), 'carriage return' (CR=13), 'tab' (TAB=9) and 'vertical TAB' (VT=11) to be regenerated and passed through the system.

Other control characters, such as the bell character (BEL=7), are not in the predetermined allowable format for an ASCII file, as defined by the AV application. So, the ASCII conformity analysing device does not regenerate the 'BEL' character in the block of ASCII codes being parsed, but will reject that ASCII character.

Other examples of analysis the ASCII conformity analysing device carries out are:

Is the natural line length less than 1024 characters?
Are word lengths less than 25 characters?
Is the percentage of spaces to characters under a pre-defined limit?

If at any time the ASCII conformity analysing device is not able to regenerate the data for that part of the ASCII code because it does not conform to the basic predetermined format, the ASCII conformity analysing device checks the data to see if it conforms to some other type of ASCII code. For example, source code, BinHex, Base 64. If the data does conform to another type of ASCII code, the data is forwarded to the relevant conformity analysing device for that ASCII type, which would be, for the examples shown above, a source code conformity analysing device, a BinHex conformity analysing device or a Base 64 conformity analysing device. It will be understood that a Base 64 ASCII code file may also include other types of files within the encoded data. These other types of files would then also be forwarded to the relevant file type conformity analysing device, and so on.

The passive content data conformity analysers for the further types of ASCII code would have further conformity limitations for the data within this part of the e-mail. For example, the file could be checked to see if it is properly structured code, has correct line lengths, and so on. Once each passive content data conformity analyser has determined that the content and parameter data conforms, and accordingly extracted it, the extracted content data is regenerated in the allowable pre-defined format using the passive content data conformity analyser.

Once the ASCII conformity analysing device has finished its task, the regenerated ASCII data is forwarded to the relevant text conformity analysing device that the data purports to be. In this embodiment, the text file is a CSV file, and so the data is forwarded to the CSV conformity analysing device.

Examples of checks carried out by the CSV conformity analysing device are as follows. The CSV conformity analysing device parses the ASCII data to ensure there are no long text paragraphs, as paragraphs are not part of the pre-defined format for CSV files. Any data that cannot be parsed because it does not conform rejected by the CSV conformity analysing device. The CSV conformity analysing device also checks, for example, to see if the number of de-limiters conforms to the normal predetermined number of de-limiters in a CSV file. When the CSV conformity analysing device determines that the data does conform, the data is regenerated into the same format.

In this manner, only parts of a text file that do conform to a predetermined format are allowed to pass to the next stage of the AV application. Only the conforming parts of the text file are regenerated with the other regenerated data type portions before being reassembled and forwarded to the destination. Therefore, any parts of the e-mail that contain a virus would not conform and so would be blocked, i.e. not regenerated and preferably erased. Any non-conforming parts are not allowed to pass through the AV application and infect the operating system.

A further example conformity analysing device is a TIFF (Tagged Image File Format) conformity analysing device, used to analyse and regenerate TIFF files.

A TIFF file has a structured format with a set of directories and tags arranged in a pre-defined format. It is not possible to determine whether the image data itself represents a meaningful image. However, the TIFF conformity analysing device parses and analyses the image data to ensure that it falls within pre-defined limits.

The header information in the TIFF file is parsed and analysed to see if the correct information is complete and intact. For example, the TIFF conformity analysing device checks to see if the header information includes resolution, size and depth fields that are within reasonable limits for a TIFF image. Further, the TIFF conformity analysing device determines if the number of strips indicated in the header matches the image data.

TIFF files are typically compressed, usually using LZW (Lempel-Ziv-Welch) compression techniques. The TIFF file includes a plurality of TIFF strips, each TIFF strip being, in this example, the lowest unit or atom or component in the image handled by the AV application 105 and to which pragmatic limits can be applied. Each TIFF strip is decompressed by the conformity analysing device to see if the strip length is within reasonable pre-defined limits. For example, if the strip length is not equal to or less than a maximum image size limit (for example, greater than a standard A0 paper size), the strip is rejected. As soon as the TIFF conformity analysing device rejects one strip, the whole TIFF file is rejected.

The TIFF conformity analysing device also carries out analysis on the tags (i.e. parameter data) within the TIFF file. The tags are checked against a pre-defined allowable format to see if, for example, the tags are in the specified order (according to the directory of tag information in the header) and the tags are inter-related in the correct manner.

When the TIFF conformity analysing device determines that the data conforms to the pre-defined allowable format, the data is regenerated to create a regenerated TIFF file having the original file name (where the file name conforms to the predetermined format). The regenerated TIFF file is forwarded to the e-mail server to be re-assembled into an e-mail.

It is also possible to have other image types within the TIFF file itself. For example, JPEG images may be encapsulated within the TIFF file. If a different image type is detected by the TIFF conformity analysing device it forwards the data associated with that image to a further conformity analysing device, in this example, a JPEG conformity analysing device. The JPEG conformity analysing device then parses and analyses the data to see if it conforms to an expected JPEG format, and if so, regenerates the data in the JPEG format. The regenerated data is then re-assembled into the regenerated TIFF file, which is then used to re-assemble a regenerated e-mail. This e-mail is then passed on to the e-mail server.

A further option available in this embodiment is for the AV application to insert warning text in place of non-conforming portions of the e-mail. That is, if a content data conformity analyser parses the data for a portion and determines that the portion does not conform to the predetermined allowable format, upon regeneration of the e-mail, the conformity analyser may insert warning text in place of the non-conforming portion informing the intended recipient of the e-mail that a portion of the e-mail was rejected by the AV application. Alternatively, if a conformity analyser rejects a whole part of an e-mail due to non-conformity, the AV application inserts warning text within the e-mail informing the intended recipient that a part of the e-mail was blocked, i.e. not regenerated and preferably erased, by the AV application.

THIRD EMBODIMENT

Figure 10:
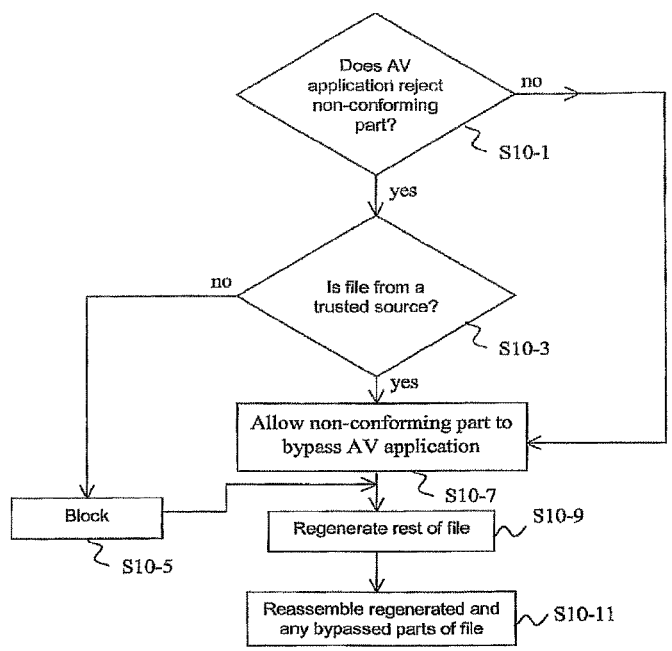
FIG. 10 shows a flow diagram of a process according to a third embodiment of the present invention.

Referring to FIG. 10, a third embodiment of the present invention will now be described. This third embodiment incorporates all the features of the first or second embodiment, including any of the options discussed in relation to the first or second embodiment.

This embodiment relates to the situation whereupon the AV application has blocked a portion, part or the whole of an e-mail (referred to as 'non-conforming part' in this embodiment). Referring to FIG. 3 as discussed in the first embodiment, this may occur for various reasons, for example, at step S3-15 an entire file may be placed in quarantine because a portion of passive content data does not conform to a predetermined format and the cleaning mode flag is not set. Alternatively, a portion of passive content data may be omitted if the cleaning mode flag is set at step S3-11.

In this embodiment, upon the determination by the AV application that an electronic file, or sub-part thereof, does not conform and so is not permitted to pass through to the destination operating system, the original electronic file is passed to a source filter application that determines whether the electronic file originates from a trusted source.

The determination is made based on what the system expects to receive from certain trusted sources. The system makes this determination by reviewing a list of data types against a predetermined list of sources stored in memory, to see if the data type is accepted from that source; in other words, emails are filtered by source. Therefore, if files that contain data that is non-conformant are received from the same trusted source, the non-conformant data is determined to not be malicious as it originates from the same trusted source and the original non-conforming data is allowed through to the operating system. In this manner, the system comprising the AV application and the source filter application dynamically allows the majority of safe electronic files through to their intended destination.

FIG. 10 shows a flow diagram of a process according to this third embodiment. At step S10-1, the AV application makes the determination as to whether the part is non-conforming and so is to be blocked. If blocked by the AV application, the non-conforming part is forwarded to a source filter application to ascertain whether the file is received from a trusted source, as shown at step S10-3.

The source filter application determines if the non-conforming part is from a trusted source based upon the system's user preferences. The system has stored within its memory a list of file types and sources (eg. address of the sender) associated with these file types that are not considered to be trusted sources. Therefore, the system can determine, based on the sender of the file and the file type, whether the file is to be allowed through.

If the determination at step S10-3 determines that the file type is not one of those listed as being allowable from the associated source, it is blocked at step S10-5. If the file type is considered to be allowable, the non-conforming part bypasses the AV application at step S10-7. The AV application regenerates the rest of the received file at step S10-9, and reassembles the regenerated conforming parts and the bypassed non-conforming parts of the file at step S10-11.

For example, if a banking system receives from a known sender a large number of e-mails including spreadsheets that incorporate complicated macros, these may be outside the predetermined allowable format for a macro within a spreadsheet attachment, and so the macro conformity analysing device would block this part of the e-mail.

However, as the banking system is able to determine who is sending the e-mails, and the sender is entered as a trusted partner of the banking system within a database for these file types, the spreadsheet within the e-mail is not considered to be malicious. Therefore, the system user can set up the source filter application to allow these non-conforming macro parts to bypass the AV application and be re-assembled into the e-mail with the regenerated parts of the e-mail.

Alternatively, the source filter application can be operated in a mode whereby it determines if a regenerated file received from the AV application should be allowed to continue through to the destination system. If the AV application receives a file that includes non-conforming parts that in themselves are not sufficiently non-conforming for the AV application to reject the whole file outright, but result in a regenerated conforming file that is substantially different from the original file, the regenerated file is forwarded to the source filter application. For example, the original file size may be considerably larger than the file size of the regenerated file due to cleaning of the file by the AV application.

The source filter application makes a determination as to whether the file type is being sent from an approved source for that file type, and if so, will allow the file type to pass through the system.

FURTHER EMBODIMENTS

It will be understood that embodiments of the present invention are described herein by way of example only, and that various changes and modifications may be made without departing from the scope of the invention.

It will be understood that the present invention may be implemented in any system wherein electronic files are moved from a source to a destination. The method of sending the electronic files for the purposes of this invention is not limited to any particular method. That is, for example, the electronic files may be transferred from one component to another component within the hardware of a computer system. Alternatively, for example, the electronic files may be transferred over an air interface from a base station to a mobile telephone device. Also, for example, the electronic files may be transmitted through a local area network (LAN), wide area network (WAN) or over the Internet.

As those skilled in the art will appreciate, in a network based environment of resource-limited destination devices such as mobile phones, each device may be provided with functionality to perform only a majority of the processes described in the above embodiments due to the limited resources. In such an environment, a further network device having full functionality may be provided on the network. The further network device may also be capable of supporting any newer functionality by incorporating the new functionality into the further network device. In this way, it is not necessary to update every resource-limited device that is present on the network. As an example, in a mobile phone network, each mobile handset may be manufactured with an initial limited set of functionality. The handset functionality could be updated by the handset user by installing a third party piece of software. If this newly installed piece of software is used to request and receive an electronic file which is of an unknown format to the AV application on that mobile handset, then the AV application will identify when it does not have the capability to process the received electronic file and will therefore pass the electronic file to the network device with the full set of functionality. The network device will have been updated to recognise this new functionality and therefore can process the received electronic file on behalf of the mobile handset. The network device can then pass the re-generated version of the electronic file back to the mobile handset. As yet a further alternative, the fully functional network device may be configured to intercept data transmitted to the mobile handset. The network device would then be able to process a particular electronic file on behalf of the functionally-limited mobile before sending a re-generated version to the mobile handset.

In the first embodiment described above, the AV application is located in the destination system. As those skilled in the art will appreciate, the AV application may instead or in addition be located at the source, somewhere in the transmission medium, or elsewhere as long as it is capable of analysing the electronic file at a point along its transmission path.

In the first embodiment described above, an electronic file consists of content data encoded and arranged in accordance with a file type specification comprising a particular set of rules. As those skilled in the art will appreciate, the electronic file 101 may be received as streaming data, such as in a video or audio stream. In such a case, instead of being encoded and arranged in accordance with a file type specification per se, the received data may instead be encoded and arranged in accordance with a protocol specification, for example a transmission protocol for streaming data. Accordingly, in addition to storing a predetermined format and rules for each file type specification, the AV application may also store predetermined formats and rules for various protocol specifications. The AV application can then process received streaming data to determine if the data is in accordance with the predetermined format for a protocol.

In the first embodiment described above, the hash database 106 and the hash generator 133 are provided within the destination system 109. As those skilled in the art will appreciate, the processing of the portions of active content data in an electronic file may instead be carried out by a traditional third party anti-virus application. For example, if the received electronic file is a Microsoft Word document with macros, the bulk of the Word document which makes up the passive content data will be processed by the AV application 105 to determine whether it is safe or not, and the macro content which makes up the active content data could be scanned by the traditional anti-virus product to see if it contained a known exploit. However, such an alternative has the disadvantage of relying on a third party anti-virus application which may be liable to zero-day attacks if that application database is not up-to-date. As a further alternative, the destination system 109 may be arranged to update its hash database 106 by downloading the hash database of known good scripts, macros, executable code etc from a reliable third party, by using for example the same mechanism as is known to download a database of signatures of viruses. This mechanism could also be used to submit macros, scripts and executable code for inclusion in the hash database of the third party.

In the first embodiment described above, if passive content data does not conform to a predetermined format and the cleaning mode flag is disabled, then the entire electronic file is quarantined. As those skilled in the art will appreciate, as an alternative to simply placing the entire file in quarantine, portions of the electronic file for which the format/specification is unknown could instead be handled in the same way as active content data. Therefore, a hash will be generated for these portions of unknown content and the hash will be checked against the hash database of good content.

In the first embodiment described above, if the cleaning mode flag is enabled, then a cleaning process is performed to remove the non-conforming portions and the content re-generator is used to re-generate the necessary null or clean section of the re-generated file in accordance with the pre-determined file type. As those skilled in the art will appreciate, in this cleaning process, the processor may additionally be configured to make obvious corrections to a portion of content data. For example, a JPEG file may be badly formed due to an obvious omission of certain data bits. In the case of such obvious errors, the missing bits may be added during the cleaning process to fix the portion of content data.

In the first embodiment described above, the hash is generated for any portion of active content data. If the scripts, macros and executable code are modified in a way that makes no semantic difference, then all the different versions of the active content data may result in different hashes which would all need to be registered in the hash database. To avoid this, the scripts, macros and executable code could be normalised so that layout and variable name changes would be removed before generating the hash to be stored in the hash database. For example, all spaces and line breaks can be removed and all variable names can be replaced with standardised notation. Although the resulting script, macro or executable code may be rendered useless, this is not important as long as a functionally identical script, macro or executable code which only differs in cosmetic detail is also normalised to the same text. As a concrete example, the following portion of code defining a Javascript function may be received within an HTML file:

```
function detectBrowser( )
{
    var browser=navigator.appName;
    var b__version=navigator.appVersion;
    var version=parseFloat(b__version);
    if ((browser=="Netscape" || browser=="Microsoft Internet
    Explorer") && (version>=4))
```

```
{
    /* Browser okay, do nothing */
}
else
{
    alert("To get full functionality you need to
    upgrade your browser");
}
}
```

This portion of code may be normalised by removing all spaces (outside of strings) and replacing all variables with standard names (in this case, $<n>$ where $<n>$ is a number that is incremented for each new variable). In this example, the resulting normalised code will look like this:

```
functiondetectBrowser( ){var$1=navigator.appName;var$2=
navigator.appVersion;var$3=parseFloat($2);if(($1=="Netscape"
||$1=="Microsoft Internet Explorer")&&($3>=4)){ /* Browser okay,
do nothing */}else{alert("To get full functionality you need to
upgrade your browser")}}
```

In the first embodiment described above, a hash is generated for portions of active content data. As those skilled in the art will appreciate, two different scripts, macros or executable code functions may give the same hash. In order to decrease the possibility of this happening, it is possible to salt the script, macro or executable code by adding random bits in a predetermined and repeatable way before the hash is generated in order to make it more difficult for someone to pass a malicious script off as a registered script. As those skilled in the art will appreciate, by modifying the active content data in such a way, it is more difficult for someone (especially having knowledge of the hash database) to create a malicious script, macro or executable code that will be passed off as allowable active content data because he/she is unlikely to also have knowledge of the process of modifying or altering the content before the hash is generated.

In the first embodiment described above, the hash database 106 is a single database storing all of the hashes for active content data previously indicated as non-malicious. As those skilled in the art will appreciate, the hash database could instead store a plurality of databases, for example, one for each known type of script, macro or executable code. In this way, the hash database look up will be specific to the type of active content data such that, for example, a V13 script would not be erroneously passed because the hash matched that of a registered Javascript.

Further, it will be understood that, as a further option for any embodiment previously described, an over-riding facility may be provided for users to manually over ride any of the determinations made by either the AV application or the source filter application when the electronic file is received. That is, when a conformity analysing device within the AV application blocks a portion, part or whole e-mail, due to its non-conformity, the user is given an option to still allow the non-conformity to be regenerated and re-assembled in the e-mail. One example of carrying out this option is to supply the intended recipient with a text warning asking them whether the non-conformant analysed e-mail should be allowed to pass through the system as if it did conform to the pre-defined allowable format. A response to this warning provides the conformity analysing device with an instruction to regenerate, if possible, and re-assemble the e-mail. Or, alternatively, the original e-mail is allowed to bypass both the AV application and source filter application to pass through the system without regeneration.

Further, it will be understood that the AV application as described in the second embodiment may be located somewhere other than at the ISP e-mail server. For example, the AV application may be located on and installed in the recipient's e-mail client server. In this manner, any e-mails forwarded by the e-mail client server to a recipient's Inbox on a hard disk drive are the regenerated e-mails as previously described.

Further, it will be understood that the AV application may be hardwired in a semiconductor device, such as, but not limited to silicon, gallium-arsenide (GaAs), indium-phosphide (InP). That is, the AV application has a quantifiable task, which does not require the need for updates to the process of defining a pre-defined conforming format. The instructions required to carry out the task of the AV application, including parsing, analysing, regeneration and re-assembling may be realised in any suitable semiconductor device. Further, the instructions required to implement the AV application might be stored in a semi-permanent or permanent memory device. The memory device would then be operable to run the AV application in association with a connected processor. In these cases, it is then possible to provide the invention separate from the computer to be protected, as a separate device (for example in a card such as a modem card, network adapter card, or disc drive controller) including processor and memory hardware separate to those of the computer to be protected. That has the advantage of isolating the incoming electronic file completely from the file system and other resources of the computer to be protected, and storing it in a location which cannot normally be written to or updated, so as to avoid "trap-door" attacks on the AV application itself; in other words, a level of physical security. The semiconductor device may consist of a processor and a memory device wherein the processor runs the AV application from the memory device and stores incoming files in the memory device to isolate them.

Further, it will be understood that the semiconductor device described above may be provided as part of on any suitable network card using conventional methods. In this manner the network card may be utilised in a communications network as a means to ensure the network is protected from unwanted code and data by regenerating the received electronic files using the methods described.

Further, it will be understood that the electronic files as described in the first embodiment may be received by a computing device, wherein the electronic files are stored on a removable memory device. For example, the electronic files may be stored on a USB disk device, a smart card, a secure digital (SD) memory device, a multi media card (MMC) memory device, a compact flash (CF) card type 1 or 2, a smart media (SM) card, a XD card, a floppy disk, a ZIP drive, a portable hard drive or any other suitable memory device that may connected, directly or over a wireless medium, to a computing device.

Further, it will be understood that an operating system as described in this application can be any system that uses files. For example, an embedded system, router, network card or the like.

Further it will be understood that other scrambling methods may be utilised to ensure any received executable files cannot be automatically executed. For example, the scrambling method stores each pair of incoming bytes using a byte swap method. In this example, if 6 bytes, A B C D E F, are being received by the AV application with byte A being received first and byte F being received last, they are stored in memory in the following order: B A D C F E. The first byte (A) is stored in a second memory location, and the second byte (B) is stored in a first memory location. This reversal occurs in subsequent memory locations for each pair of bytes received. In this manner, any executable code is not able to automatically run and so any infected electronic files are not able to infect the AV application or the destination operating system.

In the embodiments described above, an electronic file is received by the destination system for processing. As those skilled in the art will appreciate, when processing file data within a communication stream, the data will arrive at the destination system in chunks or packets of data which can then be accumulated to form the whole electronic file to be processed. In general, the received electronic file is received in whole and stored in a contiguous piece of memory. In such a case, if it is necessary to analyse data at different positions within the electronic file in order to validate the electronic file, such processing is possible because the whole file is present in memory. However, as those skilled in the art will appreciate, it is not always the case that all of the received data for an electronic file can be stored as a whole in memory. For example, devices such as network cards and routers typically have limited memory resources and it may not be appropriate to buffer an entire electronic file within these devices for processing. In such an environment, the source device such as the sender's PC, will have considerably more resources than the resource-limited network device. The source device may therefore be configured to re-write the electronic file such that all relevant sections of the file which must be processed together by the AV application will be streamed to the resource-limited device in order. In this way, the resource-limited device does not need to buffer the entire electronic file and the smaller buffer may be used to store only those portions of the file which are to be processed. Once a portion of the electronic file has been processed and determined to be non-malicious, that portion can be re-generated and immediately transmitted onto a destination device such as a recipient's PC. In this way, a streaming data transfer is achieved as opposed to a "bursty" type transfer where data flow continually starts and stops if a full buffering approach is used.

For the avoidance of doubt, protection is hereby sought for any and all of the novel embodiments described above, singly and in combinations. Having described various aspects and embodiments of the invention and modifications thereof; persons skilled in the art will appreciate that the invention can be modified in arrangement and detail without departing from the principles thereof. We claim all embodiments, variations and modifications coming within the spirit and scope of the following claims.

The invention claimed is:

1. A system for testing an electronic file analysis and re-generation module, the system comprising:
means for receiving an electronic file when a cleaning flag is set to enabled;
an analysis and re-generation module for processing the received electronic file to create a re-generated electronic file by removing nonconforming portions of the file and portions that have unknown functionality;
wherein the system is arranged to process the re-generated electronic file using the analysis and re-generation module when the cleaning flag is set to disabled; and
wherein the analysis and re-generation module is determined to be functioning correctly if processing of the re-generated electronic file using the analysis and re-generation module creates a further re-generated electronic file; and the analysis and re-generation module is determined to be functioning incorrectly if processing of the re-generated electronic file using the analysis and re-generation module does not create a further re-generated electronic file.

2. A system according to claim 1, wherein said analysis and re-generation module is an apparatus for processing an electronic file, comprising:
means for identifying a portion of content data in the electronic file;
means for determining if the identified portion of content data is passive content data having a fixed purpose or active content data having an associated function;
means for determining a file type or protocol of a portion of passive content data, and for determining whether a portion of passive content data is to be re-generated by determining if the passive content data conforms to a predetermined data format comprising a set of rules corresponding to the file type or protocol;
means for analysing a portion of active content data to determine whether a portion of active content data is to be re-generated; and
means for re-generating the portion of content data to create a re-generated electronic file, if the portion of content data is determined to be re-generated.

3. A system according to claim 2, wherein the electronic file comprises a plurality of portions of content data and wherein the apparatus is arranged to process each of said plurality of portions of content data to determine whether or not each portion of active content data is to be re-generated and to re-generate those portions of content data that are determined to be re-generated to create a re-generated electronic file.

4. A system according to claim 2, further comprising means for determining if a cleaning mode is enabled or disabled and wherein said means for re-generating portions of content data is arranged such that a re-generated electronic file is not created if it is determined that at least one portion of passive content data is not to be re-generated and the cleaning mode is disabled.

5. A system according to claim 4, wherein the apparatus is arranged to place the electronic file in quarantine if it is determined that at least one portion of passive content data is not to be re-generated and the cleaning mode is disabled.

6. A system according to claim 2, wherein said means for analysing a portion of active content data is arranged to:
generate a hash for the portion of active content data;
determine if the generated hash is present in a hash database of known active content data; and
determine that the portion of active content data is to be re-generated if it is determined that the generated hash is present in a hash database of known active content data.

7. A system according to claim 2, wherein the means for determining a file type or protocol of a portion of passive content data comprises a plurality of conformity analysers each associated with a particular file type or protocol.

8. A system according to claim 7, wherein a portion of passive content data in the electronic file comprises a plurality of sub-portions of passive content data, and each of said sub-portions is processed by a respective one of said plurality of conformity analysers to determine if the sub-portions of passive content data conform to a predetermined data format.

9. A system according to claim 2, wherein the means for re-generating a portion of content data comprises a plurality of content re-generators each associated with a particular file type or protocol.

10. A system according to claim 2, wherein said passive content data comprises text, image, audio or video content data.

11. A system according to claim 2, wherein said active content data comprises a script, macro or executable code.

12. A system according to claim 2, wherein said means for analysing a portion of active content data is further arranged to analyse a portion of passive content data if said means for determining a file type or protocol of a portion of passive content data cannot determine a file type or protocol of portion of passive content data.

13. A system according to claim 12, further comprising means for normalizing a portion of active content data.

14. A system according to claim 2, further comprising means for storing the electronic file in a scrambled format in memory.

* * * * *

UNITED STATES PATENT AND TRADEMARK OFFICE
CERTIFICATE OF CORRECTION

PATENT NO. : 9,038,174 B2
APPLICATION NO. : 13/899043
DATED : May 19, 2015
INVENTOR(S) : Samuel Harrison Hutton et al.

Page 1 of 1

It is certified that error appears in the above-identified patent and that said Letters Patent is hereby corrected as shown below:

In the specification,

In column 2, line 54, replace "most" with -- must --;
In column 5, line 14, replace ", hi" with -- . In --;
In column 13, line 3, replace "inncorrect" with -- incorrect --;
In column 13, line 32, replace "e-client server" with -- e-mail client server --;
In column 13, line 52, replace "coining" with -- running --;
In column 23, line 48, replace "V13" with -- VB --.

Signed and Sealed this
Fifteenth Day of March, 2016

Michelle K. Lee
*Director of the United States Patent and Trademark Office*